July 19, 1966 F. W. KELLEY, JR 3,262,044

ELECTRIC CONVERTING SYSTEM

Filed April 29, 1963 4 Sheets-Sheet 1

INVENTOR:
FRED W. KELLEY, JR.
BY J. Wesley Haubner
ATTORNEY.

July 19, 1966 F. W. KELLEY, JR 3,262,044
ELECTRIC CONVERTING SYSTEM
Filed April 29, 1963 4 Sheets-Sheet 2
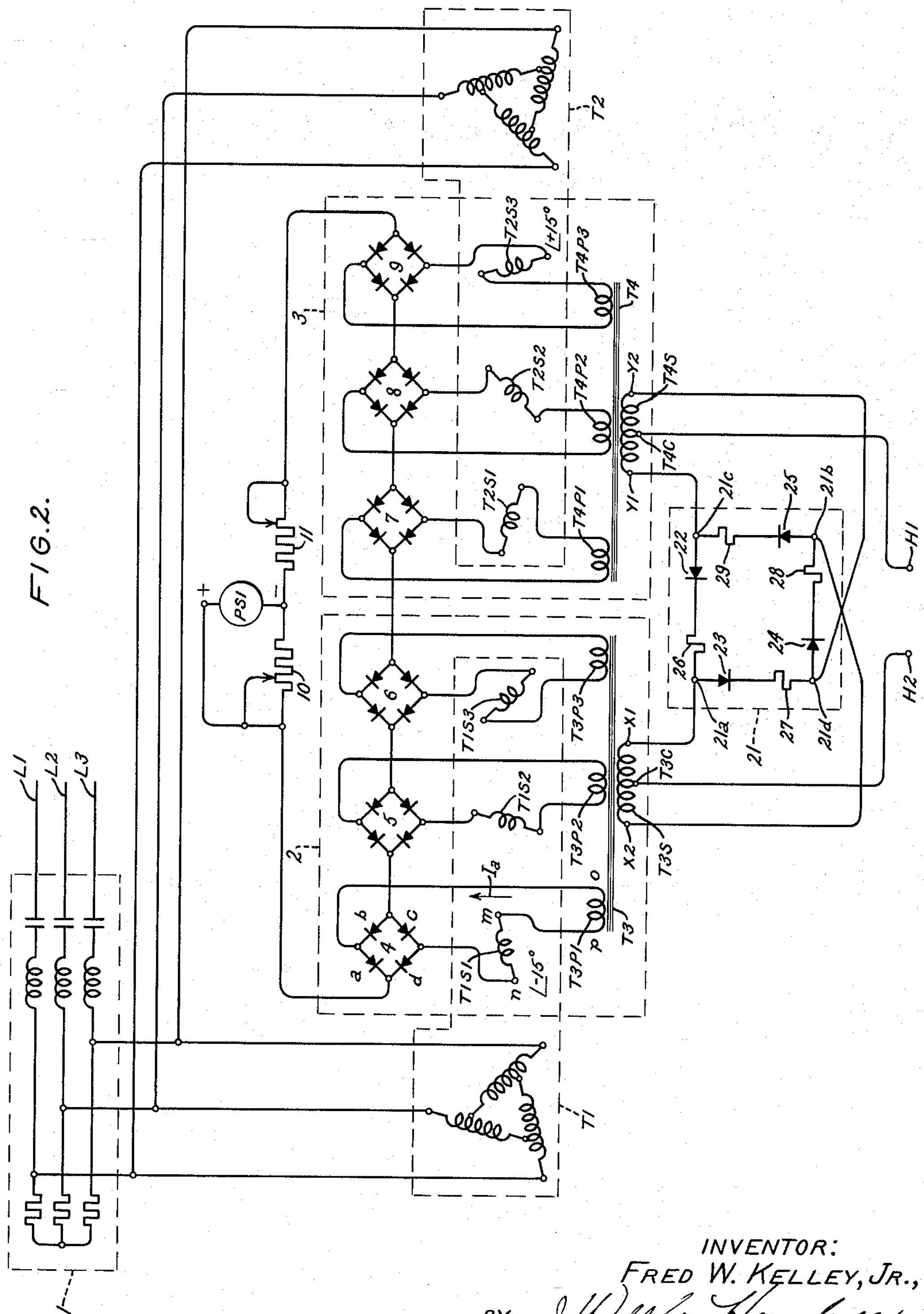
INVENTOR:
FRED W. KELLEY, JR.,
BY J. Wesley Haubner
ATTORNEY.

ELECTRIC CONVERTING SYSTEM
Filed April 29, 1963 4 Sheets-Sheet 3
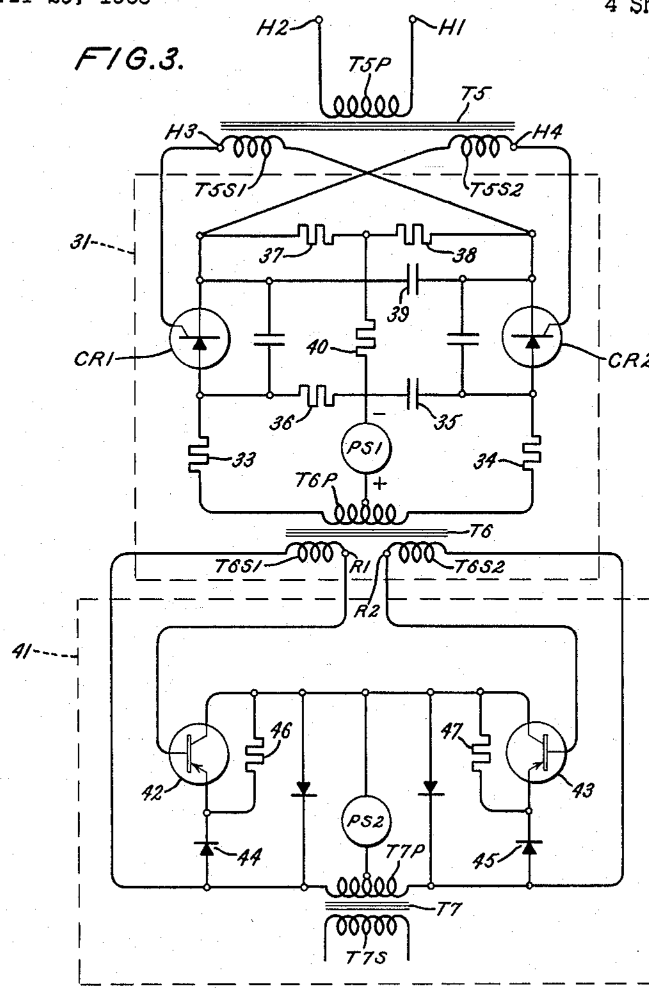
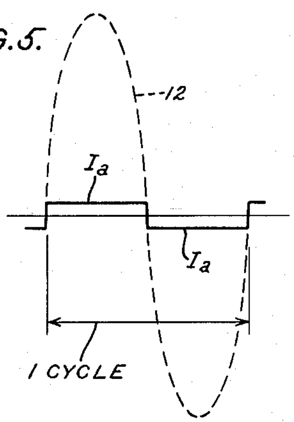
INVENTOR:
FRED W. KELLEY, JR.,
BY J. Wesley Haubner
ATTORNEY.

ELECTRIC CONVERTING SYSTEM

Filed April 29, 1963

INVENTOR:
FRED W. KELLEY, JR.,
BY J. Wesley Haubner
ATTORNEY.

United States Patent Office 3,262,044

Patented July 19, 1966

3,262,044
ELECTRIC CONVERTING SYSTEM

Fred W. Kelley, Jr., Media, Pa., assignor to General Electric Company, a corporation of New York Filed Apr. 29, 1963, Ser. No. 276,402
9 Claims. (Cl. 321—7)

This invention relates to electric converting systems, more particularly to systems for converting sine wave alternating current of one frequency to square wave alternating current of a different frequency and it has for an object the provision of a simple, reliable, and improved system of this character.

Many types of electrical devices, such for example, as sensing transducers that are excited by alternating current operate more reliably and can be built smaller if they are operated on current having a frequency that is substantially higher than the 60 cycle frequency that is generally available from commercial sources. These devices operate more reliably on square wave voltage than on sine wave voltage. Accordingly a further object of this invention is the provision of a system for converting relatively low frequency sine wave current to a relatively high frequency square wave current.

If a transducer that is excited by alternating current is being used in a regulating system for conversion apparatus that is supplied from an alternating current supply line certain problems may arise. For example, the regulating system may embody a sensing transducer excited by alternating current supplied from an inverter for controlling a three phase double way rectifier supplied from an alternating current supply line. A three phase double way rectifier causes substantial sixth harmonic of the line frequency in the load voltage. If the inverter frequency supplied to the sensing transducer is different from the harmonic frequency of the regulated system nearest to the inverter frequency by only a small amount, the difference or beat frequency will be detected by the sensing transducer. The detected beat frequency will excite the system into a modulation of the beat frequency that may be intolerable. Accordingly a further object of this invention is the provision of conversion apparatus for producing relatively high frequency currents that are synchronous with supply line frequency.

Briefly described, this invention comprises two square wave generators that are supplied from a source of fundamental frequency alternating voltage. These generators produce two harmonic square wave outputs that are angularly displaced from each other and have the same frequency. Each of the square wave generators has an output transformer that is provided with a center tapped secondary winding. The two harmonic square wave outputs of the harmonic generators are converted to a higher harmonic square wave voltage at the center taps of the secondary windings by means of a ring demodulator that interconnects the secondary windings.

In a specific embodiment of the invention that involves the production of a sixth harmonic square wave voltage, a pair of phase shift transformers are provided each having a three phase primary winding and three 120 degree phase displaced isolated secondary windings together with two third harmonic square wave generators. Each of the third harmonic generators comprises the secondary windings of one of the phase shift transformers, a plurality of full wave diode bridge rectifiers and a current summing transformer having three primary windings and a secondary winding. The input of each bridge rectifier is connected in series with a corresponding one of the isolated secondary winding of the phase shift transformers and with a corresponding primary winding of the current summing transformers. The outputs of all of the full wave rectifiers are connected in series with a resistance device. The two third harmonic square wave outputs of the third harmonic generators are converted to a sixth harmonic square wave voltage at the center taps of the secondary windings of the current summing transformers by means of a ring demodulator interconnecting the secondary windings of the current summing transformers.

For a better and more complete understanding of the invention reference should now be had to the following specification and to the accompanying drawings of which:

FIG. 2 is a simple schematic sketch of a portion of FIG. 1 which constitutes a sixth harmonic generator.

FIG. 3 is a simple schematic sketch of the sixth harmonic inverter portion of FIG. 1, FIG. 4 is a chart of characteristic curves that facilitates an understanding of the operation of the invention and FIG. 5 is a characteristic curve which facilitates an understanding of the generation of square waves.

Figure 1:
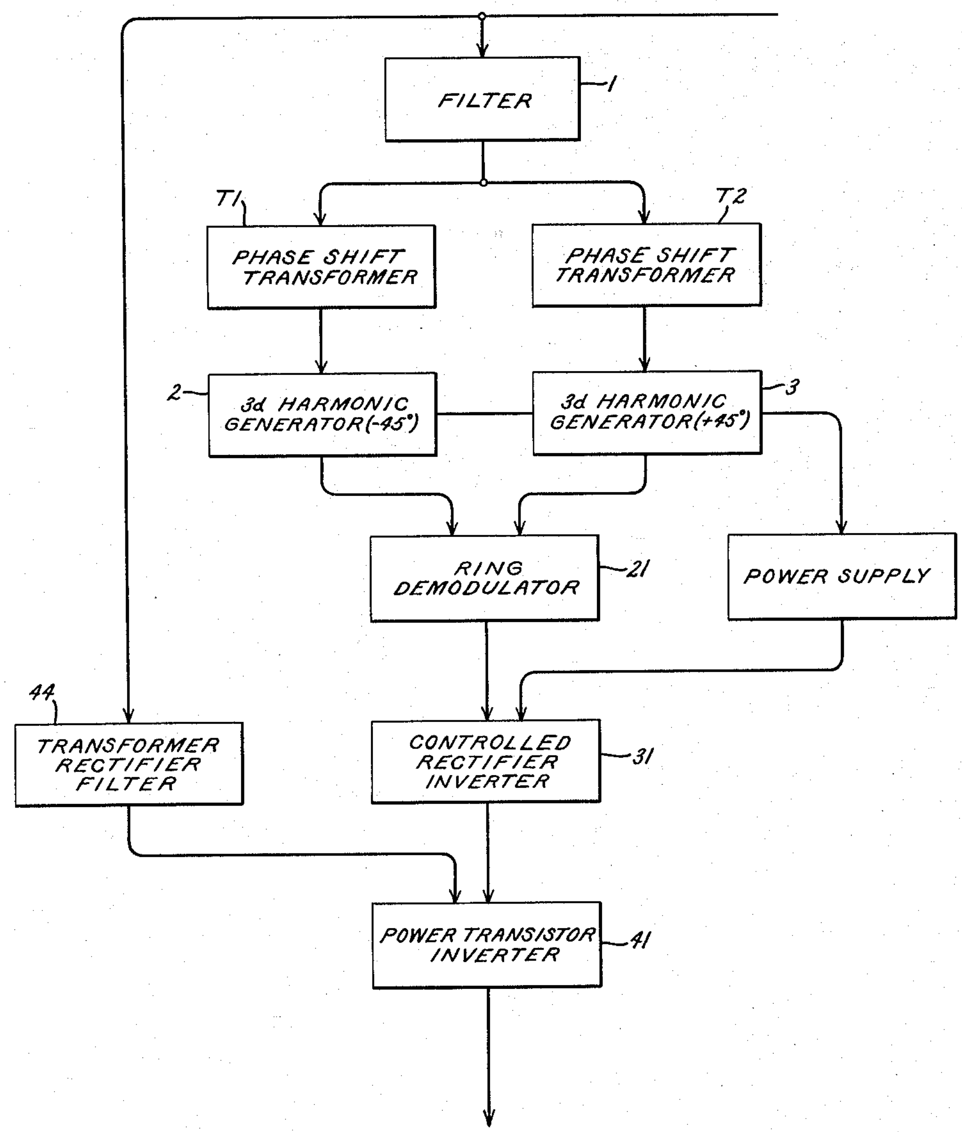
FIG. 1 is a simple sketch in block diagram form of an embodiment of the invention.

Referring now to the drawing, and particularly to FIGURES 1 and 2 thereof, a pair of three phase, phase shift transformers T1 and T2 are connected through a filter 1 to the three phase supply lines L1, L2 and L3. These transformers have extended delta primary windings that are designed to produce a 15 degree phase shift of their secondary voltages with respect to the voltage of the source. The primary windings are so connected to the source that the secondary voltages of transformer 1 lag with respect to the voltage of the source by 15 degrees and those of transformer 2 lead with respect to the voltage of the source by 15 degrees. Transformer T1 has three isolated secondary windings T1S1, T1S2 and T1S3 and similarly transformer T2 has three isolated secondary windings T2S1, T2S2 and T2S3.

For the purpose of converting the fundamental frequency currents in the secondary windings of transformers T1 and T2 to currents of which the frequencies are third harmonics of the fundamental, two third harmonic generators 2 and 3 are provided. The third harmonic generator 2 comprises the three secondary windings T1S1, T1S2 and T1S3, 3 diode full wave rectifying bridges 4, 5 and 6 and a current summing transformer T3. Similarly the third harmonic generator 3 comprises the three secondary windings T2S1, T2S2 and T2S3, 3 diode full wave rectifying bridges 7, 8 and 9 and current summing transformer T4.

Each of the current summing transformers is provided with three single phase primary windings and one single secondary winding. As shown, current summing transformer T3 has primary windings T3P1, T3P2 and T3P3 and a secondary winding T3S. Similarly transformer T4 has primary windings T4P1, T4P2, and T4P3 and a secondary winding T4S. In each of the third harmonic generators, each of the isolated secondary windings of the phase shift transformers is connected in a local series loop circuit with a corresponding one of the diode bridge rectifiers and a corresponding primary winding of the current summing transformer. For example, in third harmonic generator 2, the isolated secondary winding T1S1 is connected in a series loop circuit with the input terminals of bridge rectifier 4 and with primary winding T3P1 of the current summing transformer. Identical series loop connections are provided for the remaining bridge rectifiers 5, 6, 7, 8 and 9, corresponding secondary windings of the phase shift transformers and corresponding primary windings of the current summing transformers. The outputs of the six full wave bridge rectifiers in the two third harmonic generators are connected in series through two resistors 10 and 11.

The operation of the system as thus far described is as follows: Voltages of fundamental frequency are induced in the secondary windings T1S1, T1S2 and T1S3. These voltages are 120 degrees displaced from each other. Similarly, the voltages induced in secondary windings T2S1, T2S2 and T2S3 are displaced from each other by 120 degrees. The voltages induced in secondary windings T1S1, T1S2 and T1S3 lag the voltages of the source 15 degrees. On the other hand, the voltages induced in the secondary windings T2S1, T2S2, and T2S3 lead the voltages of the source 15 degrees. Consequently, the voltages induced in windings T1S1, T1S2, and T1S3 are displaced 30 degrees from the voltages induced in windings T2S1, T2S2 and T2S3. Each of these secondary voltages have zero value twice per cycle. Consequently, they produce twelve zeros 30 degrees apart per cycle of the source.

In each of the six local rectifier input loops the total voltage is the sum of a voltage induced in the secondary winding of a phase shift transformer and a voltage that is induced by the transformer action in a primary winding of a current summing transformer. These primary voltages are insignificant in comparison with the secondary voltages. Neglecting the insignificant primary voltages, the total rectified voltage in the series connected output circuits of rectifiers 4, 5, 6, 7, 8 and 9, is the sum of the six equally displaced rectified voltage waves of the secondary voltages of the phase shift transformers. This produces twelve phase rectification. The ripple content in twelve phase rectification is approximately one percent which is negligible. Thus the rectified current flowing through the full wave rectifiers in series and in the output circuit is essentially pure direct current having a substantially constant value.

The network of diode rectifiers and resistors 10 and 11 is a current limiting circuit which generates square wave currents in the primary windings T3P1, T3P2, T3P3, T4P1, T4P2 and T4P3. A brief explanation of this square wave generation is as follows: Because there are six full wave rectifiers operating from six voltage sources so arranged that commutations are 30° apart, a relatively constant current flows through the output terminals of the six bridge rectifiers in the forward direction.

Figure 4:
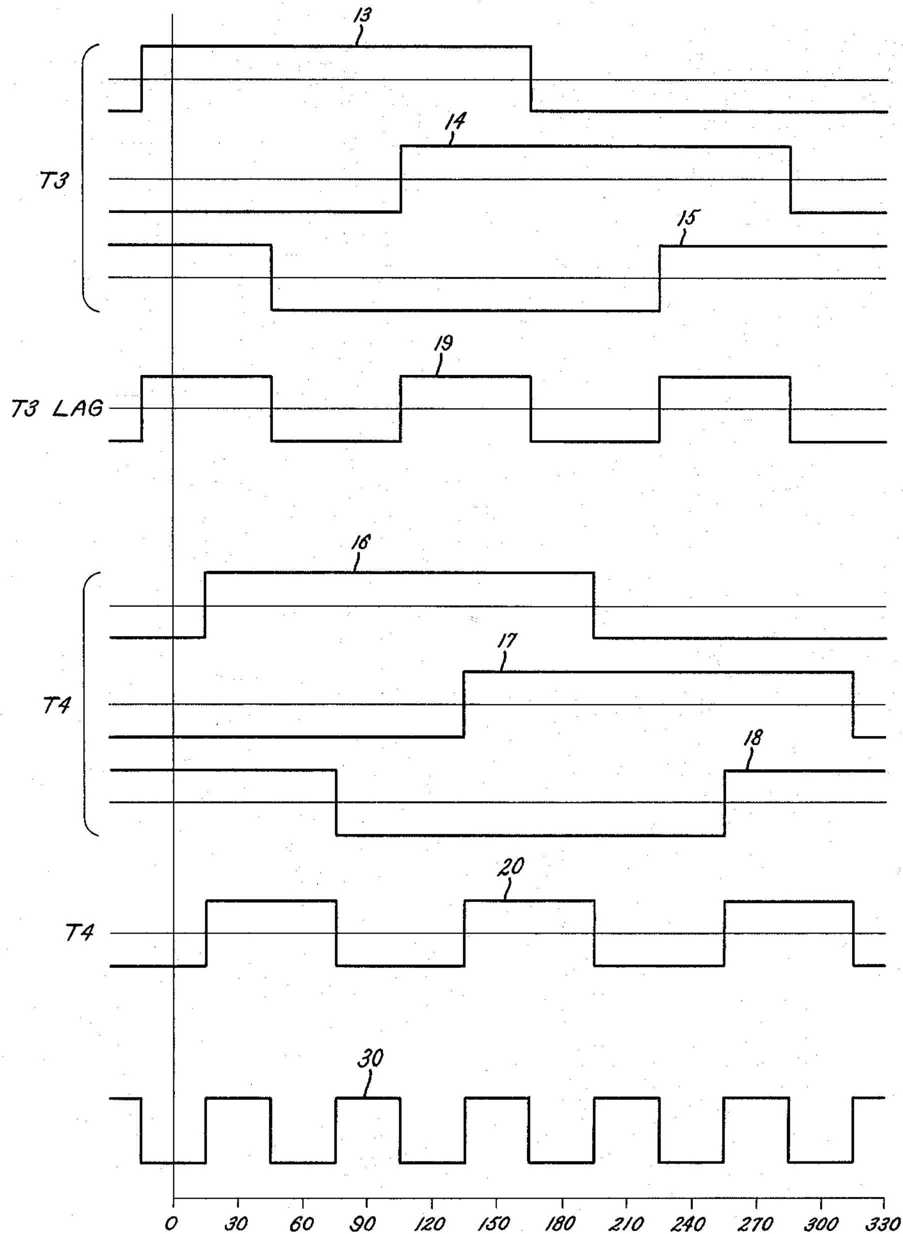

In FIG. 5 the sinusoidal curve 12 represents a single cycle of the fundamental frequency alternating voltage induced in the isolated secondary winding T1S1. It may be assumed that it represents the voltage of terminal *m* of secondary winding T1S1. As long as net forward current exists in a diode it acts as a closed switch; i.e., it presents no appreciable impedance to a reverse current as long as the reverse current is less than the forward current. Consequently, at the beginning of the positive half cycle of voltage wave 12 terminal *m* begins to go positive. Current tends to flow directly around the local short loop through T3P1 (terminal *p* to terminal *o*) and through the diodes, *a*, *b*, *c* and *d* to the terminal *n*. Because this current is initially much smaller than that portion of the forward output circuit current flowing in any one of the four diodes, all the diodes in the bridge 4 are as closed switches to it, and it builds up rapidly. As the local loop current in the diodes becomes equal to the output circuit current in the diodes, the diodes *b* and *d* become non-conducting and the local loop current denoted I*a* must take the path through diode *a*, the output circuit through resistors 10 and 11 the full wave rectifiers 9, 8, 7, 6 and 5 and diode *c* to terminal *n*. At this time, the rapid current buildup in the local loop circuit is terminated and the current is held approximately constant by the resistance of the larger network through which it now must flow as indicated in FIG. 5 by the horizontal line I*a*. A similar operation, but in the reverse sense takes place in the negative half cycle of voltage wave 12. Consequently I*a* is of a square wave nature. Thus there is generated in the primary winding T3P1 a square wave shaped current that is represented in FIG. 4 by the square wave curve 13. Similar square wave shaped currents are generated in the other two primary windings of transformer T3 and in the three primary windings of transformer T4. The currents generated in the primary windings T3P2 and T3P3 are represented in FIG. 4 by the square wave curves 14 and 15 respectively and those generated in primary windings T4P1, T4P2 and T4P3 are represented by square wave curves 16, 17 and 18 respectively. The currents generated in primary windings T3P1, T3P2 and T3P3 are synchronous with the voltages induced in secondary windings T1S1, T1S2 and T1S3 respectively; hence they are displaced from each other 120 degrees of the fundamental as illustrated in FIG. 4 by the displacements of curves 13, 14 and 15. Similarly, the currents generated in primary windings T4P1, T4P2 and T4P3 are displaced from each other 120 degrees of the fundamental as indicated by the displacements of curves 16, 17 and 18. Also, as illustrated in FIG. 4 the group of currents represented by the curves 13, 14 and 15 and the group represented by curves 16, 17 and 18 are displaced from each other 30 degrees of the fundamental.

In the current summing transformer T3, the currents represented by square wave curves 13, 14 and 15 are added at each instant of time to produce a voltage in the secondary winding T3S which is represented in FIG. 4 by curve 19. Since it is produced by the addition of square waves, it has a square wave form itself. It will be noted that this voltage has six evenly spaced zeros per cycle of the fundamental; hence it is a third harmonic of the fundamental.

In a similar manner, a square wave third harmonic voltage, represented by square wave curve 20 is produced in the secondary winding T4S. Thus, the third harmonic generators 2 and 3 produce two square wave third harmonic voltages 19 and 20. These are displaced from each other 30 degrees of the fundamental or 90 degrees of the third harmonic.

For the purpose of converting the two third harmonic square wave voltages to a sixth harmonic square voltage, a ring demodulator 21 is provided which interconnects the secondary windings T3S and T4S. This ring demodulator comprises four diodes 22, 23, 24 and 25 and four resistors 26, 27, 28 and 29 connected in the configuration of a square with one diode and one resistor connected in series in each side of the square. The secondary winding T3S of the third harmonic generator 2 is connected across the diagonally opposite terminals 21*a* and 21*b* of the ring demodulator and the secondary winding T4S of third harmonic generator 3 is connected across the other pair of diagonally opposite terminals 21*c* and 21*d* of the ring demodulator. The output of the ring demodulator is taken at the center taps T3*c* and T4*c* of the secondary windings T3S and T4S respectively. This output is a sixth harmonic square wave voltage.

The operation of the ring demodulator to convert the two third harmonic voltages to a sixth harmonic voltage is as follows: Currents from terminals *x*1 and *x*2 of secondary winding T3S and from terminals *y*1 and *y*2 of secondary winding T4S flow in the ring as determined by the connection of the diodes 22, 23, 24 and 25 and by the instantaneous polarities of terminals *x*1, *x*2, *y*1 and *y*2. The voltage drops across the resistors in the ring produce a voltage difference between the T3S and T4S secondary windings and consequently a voltage difference between their center taps T3*c* and T4*c* to which the output transformer T5 is connected.

By referring to the square wave curves 19 and 20 in FIG. 4 the instantaneous polarities of terminals *x*1, *x*2, *y*1 and *y*2 may be determined. At any instant, one of the resistors 26, 27, 28 and 29 will produce a voltage difference between the positive terminals of secondary windings T3S and T4S. The polarity of this voltage determines which of the center taps T3*c* and T4*c* is positive at a selected instant and consequently which of the terminals H1 and H2 is positive at such instant.

For example, if terminals *x*1 and *y*1 are both positive at a selected instant, current flows from positive terminal $x1$ through diode 23, resistor 27, diode 24 and resistor 28 to terminal $x2$. Similarly, current flows from positive terminal $y1$ through diode 22, resistor 26, diode 23 and resistor 27 to terminal $y2$. The current in resistor 26 produces a voltage drop which is positive at the right hand terminal and negative at the left hand terminal.

Thus the terminal $y1$ of winding T4S is positive with respect to terminal $x1$ of winding T3S. Consequently the center tap T4*c* is positive with respect to center tap T3*c* and terminal H1 of transformer T5 is positive with respect to terminal H2.

The following table illustrates the reversing polarity of terminals H1 and H2 of transformer T5 at 30 degree intervals for one half cycle of the fundamental frequency:

| | Positive Terminal | | Difference Voltage Across Ring Res. | Pos. Center Tap | Positive Terminal of T5 |
|---|---|---|---|---|---|
| | On T3 | On T4 | | | |
| 0 | $x1$ | $y2$ | 27 | T3*c* | H2 |
| 30 | $x1$ | $y1$ | 26 | T4*c* | H1 |
| 60 | $x2$ | $y1$ | 29 | T3*c* | H2 |
| 90 | $x2$ | $y2$ | 28 | T4*c* | H1 |
| 120 | $x1$ | $y2$ | 27 | T3*c* | H2 |
| 150 | $x1$ | $y1$ | 26 | T4*c* | H1 |
| 180 | $x2$ | $y1$ | 29 | T3*c* | H2 |

It will be noted that the sequence from zero degrees to 90 degrees repeats itself through successive 90 degree intervals for the full cycle. The wave form is represented by square wave form curve 30 in FIG. 4. From inspection of the two third harmonic square wave curves 19 and 20 it will be noted that the number of zeros of the output voltage wave 30 is equal to the number of zeros of the wave 19 plus the number of zeros of the wave 20 and the zeros are coincident. Thus the output voltage wave 30 is a square wave sixth harmonic of the fundamental line frequency. This sixth harmonic output voltage is used to control the firing of silicon controlled rectifiers in a silicon controlled rectifier inverter stage 31.

The inverter stage 31 comprises an output transformer T6 having a center tapped primary winding T6P, two silicon controlled rectifiers CR1 and CR2, associated resistors and capacitors, and a D.-C. power supply. Resistors 33 and 34 are connected in the anode circuits of controlled rectifiers CR1 and CR2 and a commutating capacitor 35 is connected in series with a resistor 36 across the anodes. For compensating for unbalance in the electrical characteristics of the gate to cathode circuits of the controlled rectifiers CR1 and CR2, a balancing network comprising resistors 37 and 38 and capacitor 39 is connected across the anodes of the controlled rectifiers. The connection of the sixth harmonic generator to the controlled rectifier inverter stage 31 is best visualized by placing the longitudinal bottom edge of FIG. 2 adjacent the top edge of FIG. 3 so that the terminals H2 and H1 in FIG. 2 are in alignment with terminals H2 and H1 respectively of FIG. 3.

Preferably the supply of direct current power for the controlled rectifier inverter is obtained from the series connected full wave rectifiers in the third harmonic generators. For example, D.-C. power may be obtained from the terminals of resistor 10; thus these terminals may be regarded as the terminals of a source of supply PS1. The positive terminal of the supply is connected to the center tap of the primary winding T6P of the output transformer and the negative terminal is connected through the resistor 40 to the common terminal of the resistors 37 and 38 which are connected in series across the cathodes of the controlled rectifiers.

The single phase square wave sixth harmonic output of the sixth harmonic generator is supplied to the gates of the silicon controlled rectifiers through transformer T5 which has a single primary winding T5P and two isolated secondary windings T5S1 and T5S2. Secondary winding T5S1 is connected between the cathode of controlled rectifier CR2 and the gate of control rectifier CR1; similarly secondary winding T5S2 is connected between the cathode of controlled rectifier CR1 and the gate of controlled rectifier CR2.

In operation, when the terminal H3 of secondary winding T5S1 goes positive, control rectifier CR1 conducts; when terminal H4 becomes positive, control rectifier CR2 conducts. When controlled rectifier SCR1 conducts, current flows from the positive terminal of the input D.-C. voltage source through primary winding T6P from its center tap to and through resistor 33, through control rectifier CR1 resistors 37 and 40 to the negative terminal of the D.-C. voltage source. During the next half cycle of sixth harmonic voltage when CR2 conducts, current flows from the positive terminal of the input D.-C. voltage source through the right hand portion of primary winding T6T through resistor 34, control rectifier CR2 and resistor 38 to the negative terminal of the D.-C. source. At the beginning of conduction through each controlled rectifier in each cycle, the commutating capacitor 35 acts to terminate conduction in the other. Thus conduction in the controlled rectifiers alternates and the current in the primary winding T6P reverses every time the square wave sixth harmonic input voltage reverses and it is also square wave.

The voltage wave that is supplied to the gates of the silicon controlled rectifiers is not perfectly square, i.e., the wave fronts have a slight slope. Consequently, if the gate circuit properties of CR1 and CR2 differ slightly so that CR1 fires more easily than CR2 the "time on" of CR1 (in each cycle) tends to be greater than the time on of CR2. This is undesirable because it results in inaccuracies in any measurements made with sensing devices supplied from such an unbalanced wave. Such unbalance is prevented by the compensating network comprising resistors 37 and 38 and capacitor 39. If the time on of CR1 tends to be greater than that of CR2 the capacitor 39 will accumulate a charge that is positive at its CR1 terminal and negative at its CR2 terminal. This provides a negative bias to the firing of the "easy turn on" CR1 and a positive bias to the firing of the "hard turn on" CR2 and thus provides a correction for the difference in their turn-on characteristics.

The square wave sixth harmonic output of the silicon controlled rectifier inverter stage is supplied through transformer T6 to a power transistor stage 41. It comprises a pair of power transistors 42 and 43 connected in push-pull configuration, and it is provided with an output transformer T7 having a center tapped primary winding T7P and a single secondary winding T7S. Although the D.-C. input power supply may be obtained from any suitable source it is preferably obtained from a double way rectifier bridge supplied from the three phase A.-C. source 1 and provided with a filtered output to provide a smooth D.-C. output voltage.

The secondary winding T6S1 of transformer T6 is connected to the emitter and base of transistor 42. Similarly the secondary winding T6S2 is connected to the emitter and base of transistor 43. Diodes 44 and 45 are connected in the emitter circuits of transistors 42 and 43 respectively. Resistors 46 and 47 are connected across the emitters and collectors of transistors 42 and 43 respectively. The combination of diode 44 and resistor 46 establishes a negative bias for the transistor 42 if a forward voltage exists across it. The diode 45 and resistor 47 combination performs the same function for transistor 43. As the sixth harmonic square wave current in the primary winding T6P alternately flows in one direction and then in the opposite direction, the transistors 42 and 43 are alternatively turned on. When terminal R1 of winding T6S1 becomes negative, current flows from the base of transistor 42. Similarly when terminal R2 of secondary winding T6S1 becomes negative current is drawn from the base of transistor 43. This produces a current in the output transformer T7 which reverses in a square wave sixth harmonic pattern. A square wave sixth harmonic output voltage is produced at the terminals of the secondary winding of output transformer T7. This sixth harmonic output voltage is synchronous with the voltage of the alternating current source 1.

Since numerous changes may be made in the above described apparatus and circuits and different embodiments of the invention may be made without departing from the spirit thereof, it is intended that all the matter contained in the foregoing description or shown in the accompanying drawings shall be interpreted as illustrative and not in a limiting sense.

What I claim as new and desire to secure by Letters Patent of the United States is:

1. An electric converting system comprising in combination, (1) a first generator for generating a first square wave voltage having a predetermined frequency, (2) said generator having an output transformer provided with a secondary winding having a center tap, (3) a second generator for generating a second square wave voltage synchronously related to said first voltage, angularly displaced in phase therefrom and having the same predetermined frequency, (4) said second generator having an output transformer provided with a secondary winding having a center tap and (5) means for converting said first and second square wave voltages to a higher frequency harmonic square wave voltage at said center taps comprising a ring demodulator interconnecting said secondary windings.

2. An electric converting system comprising in combination, (1) a first generator for generating a first square wave voltage having a predetermined frequency, (2) said generator having an output transformer provided with a secondary winding having a center tap, (3) a second generator for generating a second square wave voltage synchronously related to said first voltage, angularly displaced in phase therefrom and having the same predetermined frequency, (4) said second generator having an output transformer provided with a secondary winding having a center tap and (5) means for converting said first and second square wave voltages to a higher frequency harmonic square wave voltage at said center taps comprising, (a) a ring demodulator having four units connected in series in a loop circuit and having a terminal between each unit and the next in succession to provide two pairs of diametrically opposite terminals, (b) each of said units comprising a rectifier and a voltage dropping impedance connected in series, and (c) connections from the secondary winding of each of said transformers to a corresponding one of said pairs of terminals.

3. An electric current converting system comprising in combination with terminals of a source of alternating voltage of fundamental frequency, (1) means for generating a first square wave harmonic voltage comprising a square wave harmonic voltage generator supplied from said terminals and having an output transformer provided with a secondary winding having a center tap, (2) means for generating a second square wave harmonic voltage angularly displaced from said first voltage and having the same frequency comprising a second square wave harmonic voltage generator supplied from said terminals and having an output transformer provided with a secondary winding having a center tap and (3) means for converting said first and second square wave voltages to a higher harmonic square wave voltage at said center taps comprising a ring demodulator interconnecting said secondary windings, (4) said ring demodulator comprising four series connected resistance and rectifier units connected in series in the configuration of a square with one of said units in each side and a terminal at each corner to provide two pairs of diagonally opposite terminals and having electrical connections from each of said pairs of terminals to the terminals of a different one of said secondary windings.

4. An electric current converting system comprising in combination with terminals of a source of alternating voltage of fundamental frequency (1) means for generating a first square wave third harmonic voltage comprising a first square wave third harmonic voltage generator supplied from said terminals and having an output transformer provided with a secondary winding having a center tap (2) means for generating a second square wave third harmonic voltage angularly displaced from said first voltage comprising a second square wave third harmonic voltage generator supplied from said terminals and having an output transformer provided with a secondary winding having a center tap and (3) means for converting said first and second square wave third harmonic voltages to a sixth harmonic square wave voltage at said center taps comprising a ring demodulator interconnecting said secondary windings.

5. An electric current converting system comprising in combination with three phase power terminals of a source of fundamental frequency voltage, (1) a pair of phase shift transformers each having a three phase primary winding connected to said power terminals and each having three 120 degree phase displaced isolated single phase secondary windings in inductive relationship with said primary winding, (2) the voltages induced in the secondary windings of one of said transformers being displaced 30 degrees from the voltages induced in the corresponding secondary windings of the other of said transformers, (3) means for generating a first square wave third harmonic voltage and a second square wave third harmonic voltage displaced 30 degrees of the fundamental frequency voltage from said first square wave voltage comprising, (a) a pair of current summing transformers each having three primary windings and a secondary winding, (b) a plurality of full wave diode rectifiers each having its input connected in series with a corresponding one of said isolated secondary windings and a corresponding primary winding of said summing transformers, and all of said diode rectifiers having their outputs connected in a series circuit and, (c) a resistance device included in said series circuit and (4) means for converting said square wave voltages to a sixth harmonic square wave voltage comprising a ring demodulator interconnecting the secondary windings of said summing transformers and a pair of output terminals each connected to the center tap of the secondary winding of a corresponding one of said summing transformers.

6. An electric current converting system comprising in combination with three phase power terminals of a fundamental frequency voltage, (1) a pair of phase shift transformers each having a three phase primary winding connected to said alternating current circuit and each having three 120 degree phase displaced isolated single phase secondary windings, (2) the voltages induced in the secondary windings of one of said transformers being dephased 30 degrees from the voltages induced in the corresponding secondary windings of the other of said transformers, (3) means for generating two third harmonic square wave voltages displaced 30 degrees of the fundamental frequency voltage from each other comprising (a) a pair of current summing transformers each having three primary windings and a secondary winding, (b) a plurality of full wave diode rectifiers each having its input connected in series with a corresponding one of said isolated secondary windings and a corresponding primary winding of said summing transformers and all of said rectifiers having their outputs connected in a series circuit, and (c) a resistor connected in said series circuit.

(4) means for converting said third harmonic square wave voltages to a sixth harmonic square wave voltage comprising (a) a ring demodulator having four units connected in series in a loop circuit and having a terminal between each unit and the next in succession to provide two pairs of diametrically opposite terminals, (b) each of said units comprising a rectifier and a voltage dropping impedance connected in series, (c) connections from the secondary winding of each of said summing transformers to a corresponding one of said pairs of said terminals and (d) a transformer having a primary winding connected between the center taps of the secondary windings of said summing transformers.

7. An electric current converting system comprising in combination with three phase power terminals of a source of fundamental frequency voltage, (1) a pair of phase shift transformers each having a three phase primary winding connected to said power terminals and each having three 120 degree phase displaced isolated single phase secondary windings in inductive relationship with said primary winding, (2) the voltages induced in the secondary windings of one of said transformers being displaced 30 degrees from the voltages induced in the corresponding secondary windings of the other of said transformers, (3) means for generating two third harmonic square wave voltages displaced 30 degrees of the fundamental frequency voltage from each other comprising (a) a pair of current summing transformers each having three primary windings and a secondary winding, (b) a plurality of full wave diode rectifiers each having its input connected in series with a corresponding one of said isolated secondary windings and a corresponding primary winding of said summing transformers, and all of said diode rectifiers having their outputs connected in a series circuit and (c) a resistance device included in said series circuit, (4) means for converting said third harmonic square wave voltages to a sixth harmonic square wave voltage comprising a ring demodulator interconnecting the secondary windings of said summing transformers and a pair of output terminals each connected to the center tap of the secondary winding of a corresponding one of said summing transformers.

(5) and an inverter stage having an input and an output and comprising (a) a pair of silicon controlled rectifiers each having an anode, a cathode and a gate (b) said rectifiers having their gates connected to said input and having their anode-cathode conducting paths connected in alternate conducting configuration in said output (c) power supply connections for the anode-cathode paths of said controlled rectifier connected across said resistance device and (d) means for supplying said sixth harmonic voltage to said input to produce at said output a square wave sixth harmonic voltage synchronous with the voltage at said power terminals comprising a control transformer having its primary winding connected to said center tap terminals and a secondary winding connected to said input.

8. An electric current converting system comprising in combination with three phase power terminals of a source of fundamental frequency voltage, (1) a pair of phase shift transformers each having a three phase primary winding connected to said power terminals and each having three 120 degree phase displaced isolated single phase secondary windings in inductive relationship with said primary winding, (2) the voltages induced in the secondary windings of one of said transformers being displaced 30 degrees from the voltages induced in the corresponding secondary windings of the other of said transformers, (3) means for generating two third harmonic square wave voltages displaced 30 degrees of the fundamental frequency voltage from each other comprising (a) a pair of current summing transformers each having three primary windings and a secondary winding, (b) a plurality of full wave diode rectifiers each having its input connected in series with a corresponding one of said isolated secondary windings and a corresponding primary winding of said summing transformers and all of said diode rectifiers having their outputs connected in a series circuit and (c) a resistance device included in said series circuit, (4) means for converting said third harmonic square wave voltages to a sixth harmonic square wave voltage comprising, (a) a ring demodulator interconnecting the secondary windings of said summing transformers and (b) a pair of output terminals each connected to the center tap of the secondary winding of a corresponding one of said summing transformers, (5) a first inverter stage comprising (a) a pair of silicon controlled rectifiers connected in alternate conducting configuration and each having an anode, a cathode and a gate, (b) power supply connections for the anode-cathode paths of said controlled rectifiers connected across said resistance device, (c) an output transformer included in said power supply connections and (d) means for supplying said sixth harmonic square wave voltage to said gates to fire said silicon controlled rectifiers in alternation comprising a control transformer having its primary winding connected to said output terminals and a secondary winding connected to said gates, (6) and a second inverter stage having an output and having an input coupled to said output transformer of said first stage comprising (a) a pair of transistors each having a control current path and a main conducting path controlled thereby, (b) means for supplying direct current to said main conducting paths and (c) electrical connections from said input of said second inverter stage to said control current paths to render said transistors conducting in alternation to produce in the output of said second stage a sixth harmonic square wave current synchronously related to the voltage of said three phase power terminals.

9. An electric current converting system comprising in combination with three phase power terminals of a source of fundamental frequency voltage, (1) a pair of phase shift transformers each having a three phase primary winding connected to said power terminals and each having three 120 degree phase displaced isolated single phase secondary windings in inductive relationship with said primary winding, (2) the voltages induced in the secondary windings of one of said transformers being displaced 30 degrees from the voltages induced in the corresponding secondary windings of the other of said transformers, (3) means for generating two third harmonic square wave voltages displaced 30 degrees of the fundamental frequency voltage from each other comprising, (a) a pair of current summing transformers each having three primary windings and a secondary winding, (b) a plurality of full wave diode rectifiers each having its input connected in series with a corresponding one of said isolated secondary windings and a corresponding primary winding of said summing transformers and all of said diode rectifiers having their outputs connected in a series circuit and (c) a resistance device included in said series circuit, (4) means for converting said third harmonic square wave voltages to a sixth harmonic square wave voltage comprising (a) a ring demodulator interconnecting the secondary windings of said summing transformers and (b) a pair of output terminals each connected to the center tap of the secondary winding of a corresponding one of said summing transformers, and (5) an inverter stage comprising (a) an output transformer (b) a pair of silicon controlled rectifiers connected in alternate firing configuration and each having an anode, a cathode, and a gate (c) means for supplying direct voltage from said resistance device through the primary winding of said output transformer to the anode cathode circuits of said controlled rectifiers and (d) means for supplying said sixth harmonic square wave voltage to said gates comprising a control transformer having its primary winding connected to said center tap terminals and its secondary winding connected to said gates to fire said controlled rectifiers in alternation to produce a square wave sixth harmonic current in said output transformer.

No references cited.

JOHN F. COUCH, *Primary Examiner.*

W. H. BEHA, *Assistant Examiner.*